US008012346B2

(12) United States Patent
Peters, Jr. et al.

(10) Patent No.: US 8,012,346 B2
(45) Date of Patent: Sep. 6, 2011

(54) STORM SEWER INSERT FOR FILTERING AND TREATING STORMWATER (75) Inventors: John Peters, Jr., Manorville, NY (US); John E. Markee, Selden, NY (US)

(73) Assignee: Fabco Industries, Inc., Jericho, NY (US)

( * ) Notice: Subject to any disclaimer, the term of this patent is extended or adjusted under 35 U.S.C. 154(b) by 1564 days.

(21) Appl. No.: 11/199,506

(22) Filed: Jul. 21, 2005

(65) Prior Publication Data
US 2006/0102543 A1 May 18, 2006

Related U.S. Application Data (60) Provisional application No. 60/589,759, filed on Jul. 21, 2004.

(51) Int. Cl.
*E03F 5/042* (2006.01)
*C02F 1/28* (2006.01)

(52) U.S. Cl. ............... 210/170.03; 210/232; 210/282; 210/434; 210/477; 210/474; 210/501; 210/502.1; 210/163; 210/500.37

(58) Field of Classification Search ........... 210/163, 210/164
See application file for complete search history.

(56) References Cited

U.S. PATENT DOCUMENTS

| | | | | |
|---|---|---|---|---|
| 232,948 A * | 10/1880 | Dernham | | 210/318 |
| 587,559 A * | 8/1897 | Riley | | 4/289 |
| 664,945 A * | 1/1901 | Guion | | 4/652 |
| 1,686,415 A * | 10/1928 | Lyes | | 210/247 |
| 2,432,203 A * | 12/1947 | Miller | | 210/532.1 |
| 3,713,539 A * | 1/1973 | Thompson et al. | | 210/164 |
| 4,321,713 A * | 3/1982 | Thompson | | 4/290 |
| 4,419,232 A * | 12/1983 | Arntyr et al. | | 210/164 |
| RE31,561 E * | 4/1984 | Thompson | | 4/290 |
| 4,462,123 A * | 7/1984 | Morris et al. | | 4/286 |
| 4,487,690 A * | 12/1984 | Logsdon | | 210/163 |
| 5,032,264 A * | 7/1991 | Geiger | | 210/163 |
| 5,037,541 A * | 8/1991 | Ruey-Jang et al. | | 210/141 |
| 5,069,781 A * | 12/1991 | Wilkes | | 210/164 |
| 5,284,580 A * | 2/1994 | Shyh | | 210/163 |
| 5,297,367 A * | 3/1994 | Sainz | | 52/12 |
| 5,397,464 A * | 3/1995 | Hannon | | 210/163 |
| 5,486,287 A * | 1/1996 | Murphy et al. | | 210/164 |
| 5,622,630 A | 4/1997 | Romano | | |
| 5,632,889 A * | 5/1997 | Tharp | | 210/165 |
| 5,643,445 A * | 7/1997 | Billias et al. | | 210/162 |
| 5,707,527 A | 1/1998 | Knutson et al. | | |
| 5,720,574 A * | 2/1998 | Barella | | 405/52 |
| 5,744,048 A | 4/1998 | Stetler | | |
| 5,820,762 A * | 10/1998 | Bamer et al. | | 210/661 |
| 5,954,952 A | 9/1999 | Strawser, Sr. | | |
| 5,958,226 A * | 9/1999 | Fleischmann | | 210/165 |
| 5,985,157 A * | 11/1999 | Leckner et al. | | 210/747 |
| 6,027,639 A | 2/2000 | Lenhart, Jr. et al. | | |

(Continued)

*Primary Examiner* — Robert James Popovics
(74) *Attorney, Agent, or Firm* — Knoble Yoshida & Dunleavy, LLC (57) ABSTRACT A storm sewer insert for use in a storm water drainage system includes a collection basin that has an upper inlet opening, a lower outlet opening and at least one overflow bypass opening defined therein. A filter assembly is preferably positioned in the lower opening of the collection basin for filtering storm water that is held in the collection basin. Advantageously, adjustable mounting structure is provided for mounting the collection basin to an inlet opening of a storm sewer or catch basin. In addition, a mosquito barrier is preferably provided for reducing mosquito passage through the bypass opening.

20 Claims, 7 Drawing Sheets

U.S. PATENT DOCUMENTS

| | | | |
|---|---|---|---|
| 6,045,691 A * | 4/2000 | McDermott | 210/164 |
| 6,059,964 A | 5/2000 | Strawser, Sr. | |
| 6,059,966 A * | 5/2000 | Brandhofer et al. | 210/232 |
| 6,080,307 A | 6/2000 | Morris et al. | |
| 6,086,758 A * | 7/2000 | Schilling et al. | 210/164 |
| 6,099,723 A | 8/2000 | Morris et al. | |
| 6,106,707 A * | 8/2000 | Morris et al. | 210/163 |
| 6,178,565 B1 * | 1/2001 | Franco | 4/291 |
| 6,217,757 B1 | 4/2001 | Fleischmann | 210/163 |
| 6,231,758 B1 * | 5/2001 | Morris et al. | 210/163 |
| 6,241,889 B1 | 6/2001 | Haley, III | |
| 6,270,663 B1 * | 8/2001 | Happel | 210/163 |
| 6,274,036 B1 * | 8/2001 | Ellis | 210/164 |
| 6,277,274 B1 | 8/2001 | Coffman | |
| 6,287,459 B1 * | 9/2001 | Williamson | 210/99 |
| 6,306,293 B1 * | 10/2001 | Schilling et al. | 210/164 |
| 6,350,374 B1 | 2/2002 | Stever et al. | |
| 6,402,942 B2 | 6/2002 | Cardwell et al. | |
| 6,447,686 B1 | 9/2002 | Choi et al. | |
| 6,531,059 B1 * | 3/2003 | Morris et al. | 210/164 |
| 6,537,446 B1 * | 3/2003 | Sanguinetti | 210/163 |
| 6,537,448 B2 * | 3/2003 | Houk | 210/164 |
| 6,551,023 B2 * | 4/2003 | Allard | 405/36 |
| 6,554,997 B1 * | 4/2003 | Schilling et al. | 210/164 |
| 6,562,233 B1 * | 5/2003 | Schilling et al. | 210/164 |
| 6,609,852 B2 * | 8/2003 | Wimberger | 405/40 |
| 6,668,390 B1 * | 12/2003 | Gonzalez | 4/291 |
| 6,793,811 B1 * | 9/2004 | Fleischmann | 210/163 |
| 6,797,162 B2 * | 9/2004 | Happel | 210/163 |
| 6,837,652 B1 * | 1/2005 | Rost et al. | 405/40 |
| 6,869,525 B1 * | 3/2005 | Happel | 210/163 |
| 6,872,029 B2 * | 3/2005 | Allard et al. | 405/36 |
| 6,976,808 B2 * | 12/2005 | Allard | 405/36 |
| 6,986,621 B2 * | 1/2006 | Allard | 405/36 |
| 6,997,636 B2 * | 2/2006 | Tremouilhac | 404/5 |
| 7,040,838 B2 * | 5/2006 | Allard et al. | 405/36 |
| 7,052,207 B1 * | 5/2006 | Wimberger | 405/40 |
| D523,537 S * | 6/2006 | Howard | D23/261 |
| 7,112,274 B1 * | 9/2006 | Sanguinetti | 210/163 |
| 7,132,045 B1 * | 11/2006 | Trangsrud | 210/163 |
| 7,178,675 B2 * | 2/2007 | Votel | 210/473 |
| 7,288,188 B2 * | 10/2007 | Al-Assfour | 210/164 |
| D557,385 S * | 12/2007 | Trangsrud | D23/268 |
| 7,309,420 B1 * | 12/2007 | Trangsrud | 210/163 |
| D559,959 S * | 1/2008 | Trangsrud | D23/268 |
| 7,504,024 B1 * | 3/2009 | Batten et al. | 210/91 |
| 2002/0048490 A1 | 4/2002 | Allard et al. | 405/43 |
| 2002/0070151 A1 * | 6/2002 | Houk | 210/163 |
| 2003/0034286 A1 | 2/2003 | Butler | |
| 2003/0127380 A1 * | 7/2003 | Morris et al. | 210/164 |
| 2003/0132150 A1 * | 7/2003 | Happel | 210/163 |
| 2004/0035772 A1 * | 2/2004 | McGinn | 210/163 |
| 2004/0232057 A1 * | 11/2004 | Orozco et al. | 210/86 |
| 2005/0183997 A1 * | 8/2005 | Happel et al. | 210/163 |
| 2005/0230317 A1 * | 10/2005 | Belasco et al. | 210/691 |
| 2005/0247612 A1 * | 11/2005 | Glassheim | 210/163 |
| 2006/0049085 A1 * | 3/2006 | Parker | 210/163 |
| 2006/0102543 A1 * | 5/2006 | Peters et al. | 210/170 |
| 2006/0207922 A1 * | 9/2006 | Dussich | 210/164 |
| 2008/0017562 A1 * | 1/2008 | Tripodi et al. | 210/163 |
| 2008/0023382 A1 * | 1/2008 | Longo et al. | 210/164 |
| 2008/0093280 A1 * | 4/2008 | Kang | 210/163 |

* cited by examiner

STORM SEWER INSERT FOR FILTERING AND TREATING STORMWATER

This application claims priority under 35 USC §119(e) based on U.S. Provisional Application Ser. No. 60/589,759, filed on Jul. 21, 2004, the entire disclosure of which is hereby incorporated by reference as if it were set forth fully herein.

BACKGROUND OF THE INVENTION

1. Field of the Invention

This invention relates generally to the field of environmental remediation of storm water. More specifically, this invention relates to an improved system and process for treating storm water that enters a storm sewer, otherwise known as a catch basin, of a storm drainage system, and that further is effective in reducing mosquito infestation of such systems.

2. Description of the Related Technology

Storm water that is created by storm runoff in heavily developed areas is typically channeled into storm drainage systems that eventually drain into nearby streams, creeks, rivers or other bodies of water. Unfortunately, paved surfaces that bear automobile traffic typically become coated with significant pollutants such as heavy metals and volatile organic compounds, both under normal traffic conditions and in particular when motor vehicle accidents occur. When normal rain or snowfall occurs, these pollutants tend to be swept away with the runoff storm water and eventually lead to contamination of the bodies of water that eventually receive them. Such contamination has become a significant environmental issue in many areas. In addition, a significant amount of debris such as bottles and cans tends to be swept away by storm water runoff.

Storm sewers, otherwise known as catch basins, line the streets of most major cities to reduce accumulation of surface water as a result of rain. Rainwater can wash street debris into the storm sewers. Because the collection chamber of the storm sewer is typically designed to drain out of the side, only after a certain level of water accumulates, most often they remain partially full of old water and organic debris, and attract female mosquitoes to lay their eggs. It has been widely observed that the volume of mosquitoes found in storm sewers is related to the size of the aperture or manhole, the smaller the manhole the less likely mosquitoes are to enter.

A need exists for an improved system and process for processing storm water that is effective in removing heavy metals, as well as hydrocarbons and other volatile organic compounds, from storm water that enters storm sewers. There is further a need for a system and process that is effective in reducing mosquito infestation of storm sewers.

SUMMARY OF THE INVENTION

Accordingly, it is an object of the invention to provide an improved system and process for processing storm water that is effective in removing heavy metals, as well as hydrocarbons and other volatile organic compounds, from storm water that has entered a storm sewer. It is further an object of the invention to provide a system and process that is effective in reducing mosquito infestation of storm sewers.

In order to achieve the above and other objects of the invention, a storm sewer insert for use in a storm water drainage system according to a first aspect of the invention includes a collection basin, the collection basin having an upper inlet opening and a lower outlet opening; filtration structure positioned in the lower opening of the collection basin for filtering storm water that is held by the collection basin; and adjustable mounting structure for mounting the collection basin to an inlet opening of a storm sewer.

According to a second aspect of the invention, a storm sewer insert for use in a storm water drainage system preferably includes passage defining structure defining a passage through which storm water will be constrained to flow; an insect barrier for reducing insect passage through the passage; and mounting structure for mounting the passage defining structure to an inlet opening of a storm sewer.

A storm sewer insert for use in a storm water drainage system according to a third aspect of the invention includes a collection basin, the collection basin having an upper inlet opening, a lower outlet opening and at least one bypass opening; filtration structure positioned in the lower opening of the collection basin for filtering storm water that is held by the collection basin; and an insect barrier for reducing insect passage through the bypass opening.

A method of installing a storm sewer storm water treatment insert according to a fourth aspect of the invention includes steps of providing a storm water treatment insert having a collection basin, an upper inlet opening, and a lower inlet opening having filtration media positioned therein; measuring at least one dimension of an inlet opening of a storm sewer; and positioning a mounting flange with respect to the collection basin in accordance with the measurement.

According to a fifth aspect of the invention, an insert for a storm sewer includes a collection basin, said collection basin having an inlet opening and an outlet opening; and a modular filtration cartridge releasably secured within the outlet opening.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
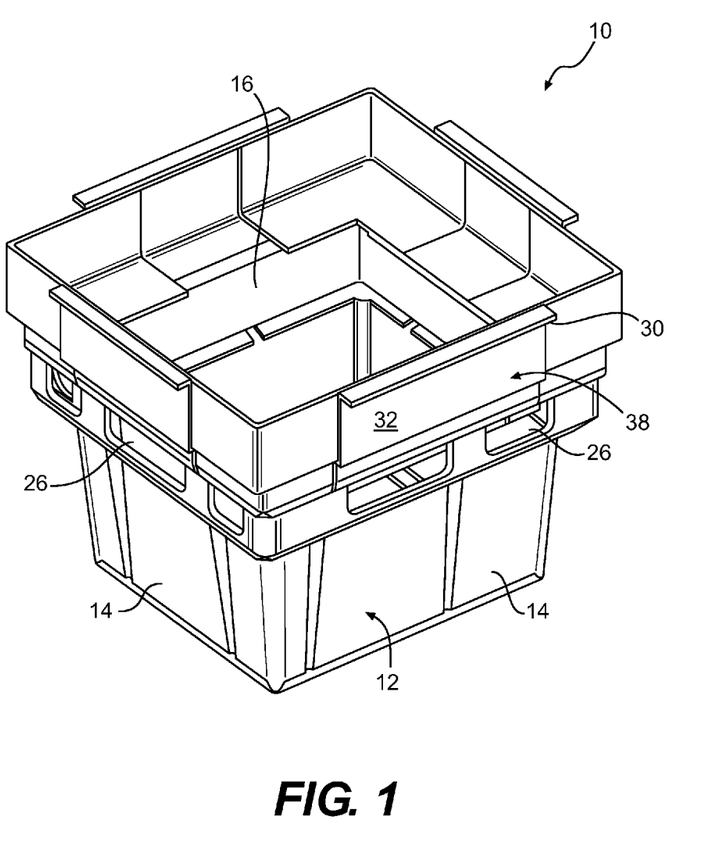
FIG. 1 is a perspective view of a storm sewer insert that is constructed according to a preferred embodiment of the invention.
Figure 2:
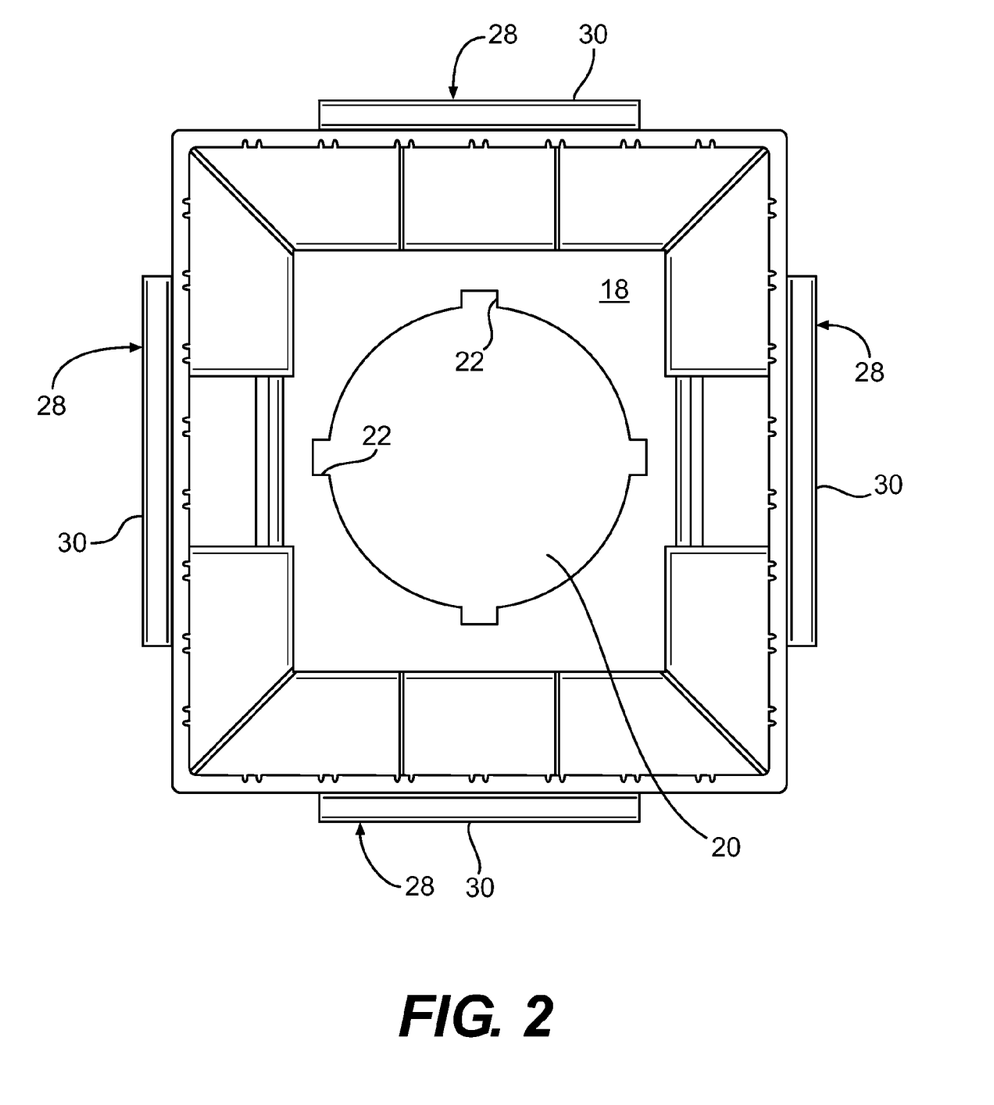
FIG. 2 is a top plan view of the storm sewer insert that is depicted in FIG. 1.
Figure 3:
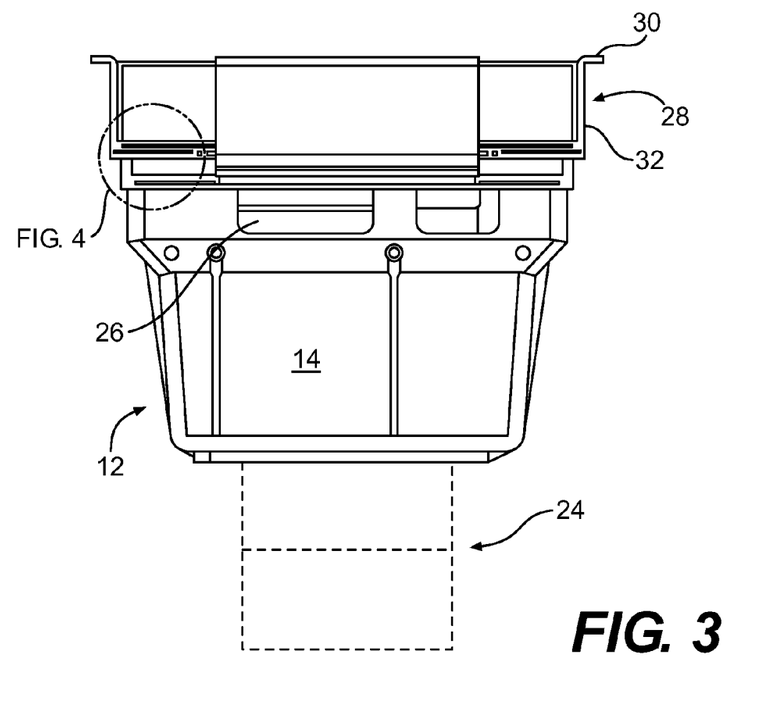
FIG. 3 is a side elevational view of the storm sewer insert that is depicted in FIG. 1.
Figure 7:
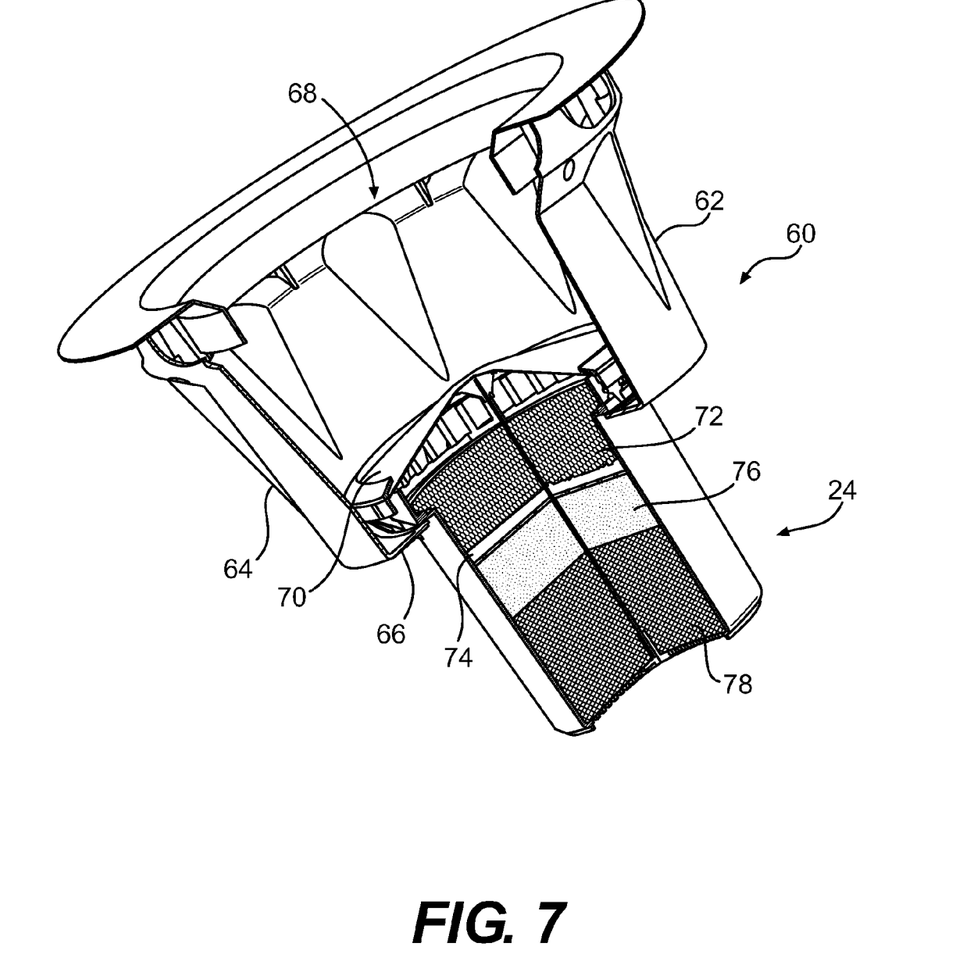
FIG. 7 is a perspective view of a storm sewer insert that is constructed according to a alternative embodiment of the invention.

Referring now to the drawings, wherein like reference numerals designate corresponding structure throughout the views, and referring in particular to FIG. 1, a storm sewer insert 10 that is constructed according to a preferred embodiment of the invention includes a collection basin 12 having a plurality of substantially vertical sidewalls 14. Collection basin 12 has a broad, funnel-like upper inlet opening 16 and a lower outlet opening 20 that is defined in a bottom wall 18 thereof, as is best shown in FIG. 2 and is preferably fabricated from a rugged polymeric material, such as a polypropylene-polyethylene copolymer. In operation, a filtration and water treatment unit 24 will be mounted within the lower outlet opening 20 for filtering and treating storm water that has collected in the collection basin 12. Filtration and water treatment unit 24, which is best shown in FIG. 7, is preferably constructed and arranged as a modular unit that is releasably attachable to the collection basin 12. For that purpose, a plurality of keyways 22 are provided in the portion of the bottom wall 18 that defines the lower outlet opening 20. Filtration and water treatment unit 24 is preferably constructed so that it may be releasably attached to the collection basin 12 by being inserted into the lower outlet opening 20 and twisted.

During conditions of low storm water flow, all of the storm water that is collected within the collection basin 12 will pass through filtration and water treatment unit 24 prior to entering the storm sewer to which the storm sewer insert 10 is mounted. The storm water is induced to flow through the filtration and water treatment unit 24 by gravity. During conditions of heavy rainfall and flooding, however, the volume of storm water entering the collection basin 12 may be an excess of that which can be processed by the filtration and water treatment unit 24. In that event, excess storm water will be permitted to flow through a plurality of bypass openings 26 that are defined at an upper end of the substantially vertical sidewalls 14 of the collection basin 12.

Figure 4:
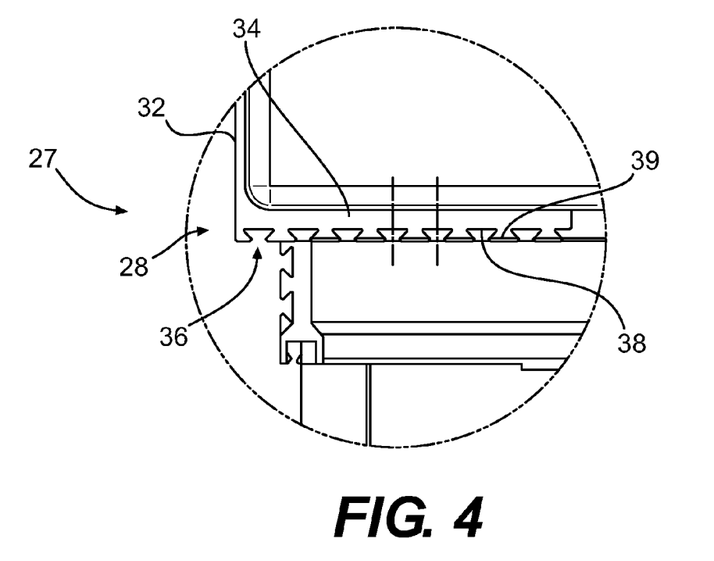
FIG. 4 is an enlarged view of the portion of FIG. 3 that is indicated in dashed circle 4-4.
Figure 5:
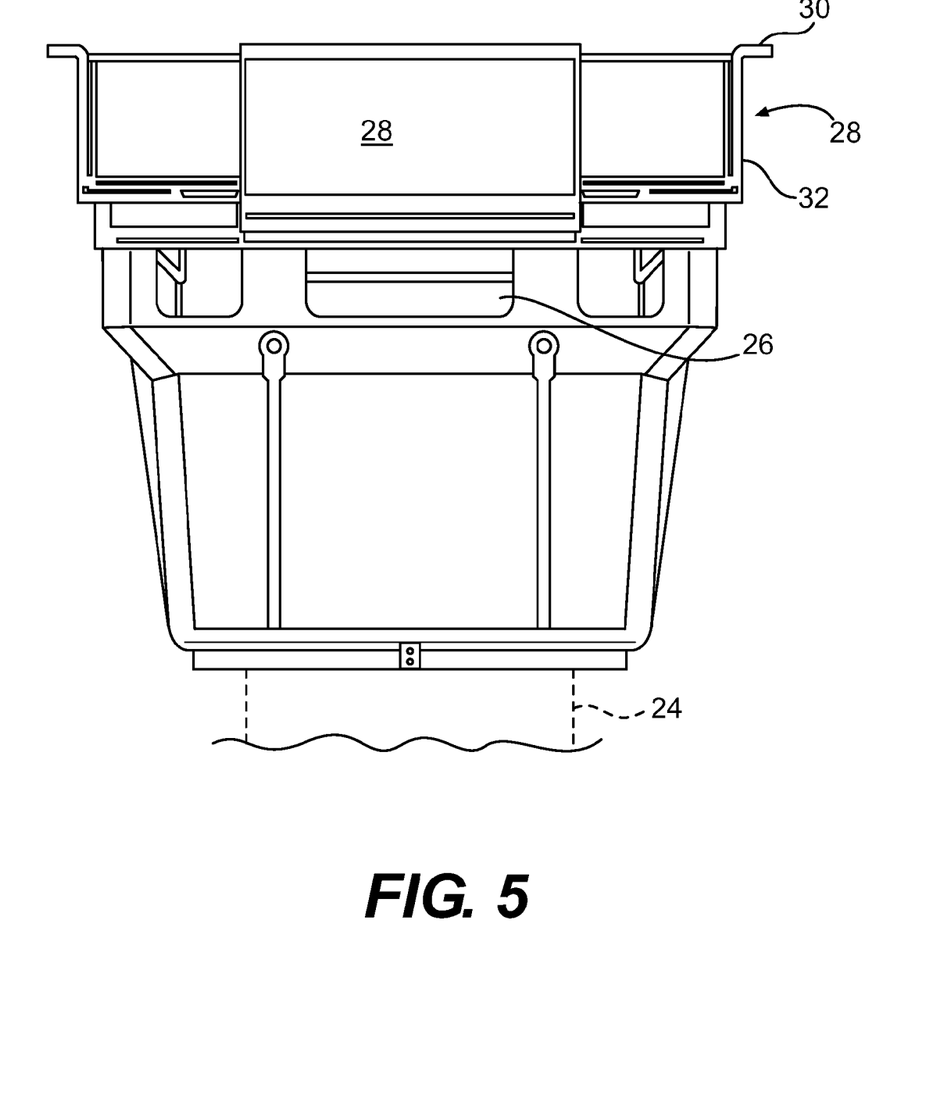
FIG. 5 is a front elevational view of the storm sewer insert that is depicted in FIG. 1.

Storm sewer inlets tend to vary widely in their actual dimensions, even when supposedly constructed to a nominal norm, making it difficult to install nonadjustable storm sewer inserts in the field. According to one particularly advantageous feature of the invention, storm sewer insert 10 is provided with adjustable mounting system 27 for mounting the collection basin 12 to an inlet opening of a storm sewer. Adjustable mounting system 27 includes a plurality of mounting flanges 28, each of which has a substantially horizontal upper lip 30 that is constructed and arranged to contact a flat generally horizontal surface of an inlet opening of the storm sewer. Horizontal upper lip 30 extends laterally outwardly from the sidewalls 14 of the collection basin 12, as may be seen in FIG. 1. Each mounting flange 28 further includes a vertical portion 32 and a lower horizontal portion 34 that extends inwardly toward the center of the collection basin 12. As is best shown in FIG. 4, lower horizontal portion 34 includes a contoured lower surface 36 having a plurality of dovetail shaped grooves 38 and a corresponding plurality of dovetail shaped projections 39. Mounting flanges 28 are preferably constructed of a rigid metallic material that is resistant to corrosion, such as aluminum.

Figure 6:
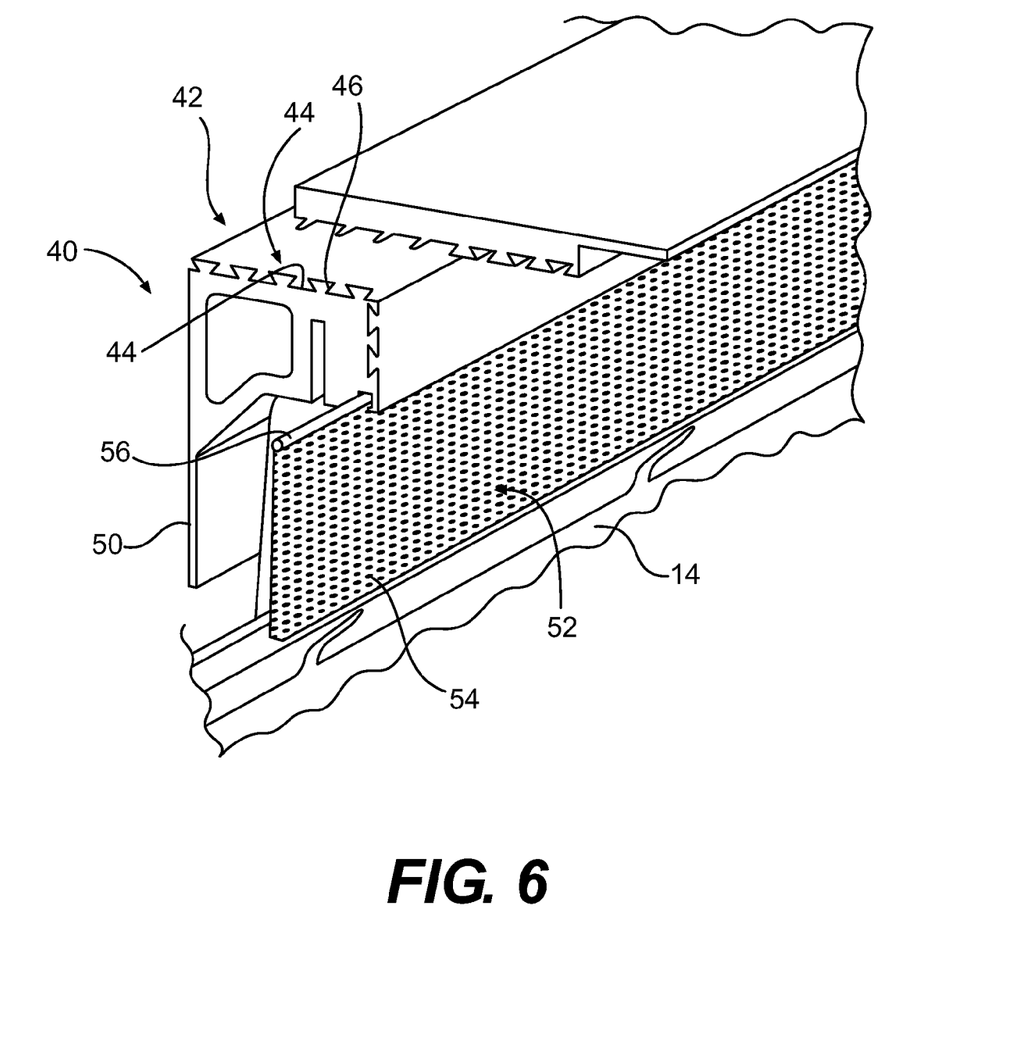
FIG. 6 is a fragmentary perspective view of a portion of the storm sewer insert that is depicted in FIG. 1.

Looking now to FIG. 6, it will be seen that a rigid deflector member 40 is secured to an upper end of each of the substantially vertical sidewalls 14 of the collection basin 12. Deflector member 40 is preferably fabricated from a rigid metallic material that is resistant to corrosion, such as aluminum. Each deflector member 40 preferably includes an integral mounting bracket 42 having a substantially horizontal contoured upper surface 44 that has a plurality of dovetail shaped projections 46 and a corresponding plurality of dovetailed shaped grooves 48. The contoured upper surface 44 is specifically designed to be interengageable with the contoured lower surface 36 of a respective mounting flange 28 in at least two alternative positions, so that the degree of lateral extension of the substantially horizontal upper lip 30 of the mounting flange 28 may be adjusted. In the preferred embodiment, contoured upper surface 44 is interengageable with the contoured lower surface 36 in a plurality of different positions, ensuring a high degree of adjustability. The dovetail shaped projections 39 of the lower horizontal portion 34 are sized and shaped to be received within the dovetailed shaped grooves 48 of the horizontal contoured upper surface 44, while the dovetail shaped projections 46 of the horizontal contoured upper surface 44 are sized and shaped to be received within the dovetailed shaped grooves 38 of the contoured lower surface 36. The dovetail shape of the respective projections and grooves in shores a secure locking interfit between the deflector member 40 and the mounting flange 28, ensuring that the collection basin 12 will remain securely in position even during flooding conditions.

In the embodiment of the invention that is depicted in FIGS. 1-6, collection basin 12 is rectangular in shape, having four sidewalls 14. As a result, four adjustable mounting flanges 28 are provided, each of which may be adjusted independently of the others, ensuring a high degree of adaptability when being mounted within nonstandard storm sewer inlets.

Each deflector member 40 further preferably includes a downwardly depending substantially vertical apron 50 that is substantially parallel to and spaced a predetermined distance from a respective bypass opening 26. During overflow conditions, oil and floatable debris that has entered collection basin 12 will tend to remain at the surface of the water that has collected within the collection basin 12. As a flooding condition progresses, the water level within the collection basin 12 will rise, and as it rises, the downwardly depending aprons 50 of the respective deflector members 40 will tend to keep such materials centered within the collection basin 12 and prevented from entering the storm sewer via the bypass opening 26.

Referring again to FIG. 6, a second particularly advantageous aspect of the invention is the provision of insect barriers 52 for reducing insect passage through the respective bypass openings 26. In particular, insect barriers 52 are designed to reduce and preferably to substantially prevent mosquitoes from passing through the bypass openings 26. In the preferred embodiment, insect barrier 52 is constructed of a plurality of closely spaced vertically oriented filaments 54 that extend outwardly from a substantially horizontal mounting rod 56 that is secured to the deflector member 40. During overflow conditions, storm water flow will actually tend to clean dirt and debris from the individual filaments 54 of the insect barrier 52, which is why this construction is preferred over a mesh screen, which would tend to quickly be clogged by dirt and debris. Alternatively, however, insect barrier 52 could be constructed of a screen mesh material, or as a hinged flap that normally remains positioned against the sidewall 14 in order to seal the bypass opening 26, but that is forced open during overflow conditions.

It has been found by orienting the individual filaments 54 substantially vertically, the self cleansing action during overflow conditions will be enhanced.

It is anticipated that this aspect of the invention will create significant public health benefits as disease carrying insect such as mosquitoes are known to inhabit and reproduce within storm sewers.

Referring now to FIG. 7, a storm sewer insert 60 that is constructed according to a second preferred embodiment of the invention is adapted to fit within circular storm sewer inlet openings. Insert 60 includes a collection basin 62 having a substantially cylindrical sidewall 64 and a bottom wall 66 in which an outlet opening is defined. A funnel-like inlet opening 68 is defined at the top of the collection basin 62 and a filtration and water treatment unit 24 that is identical to that described above with reference to the first embodiment of the invention is secured within the outlet opening.

Filtration and water treatment unit 24 is preferably constructed as a modular unit that is releasably securable to the collection basin and has a sealed casing to retain pollutants for safe handling and transportation. It preferably includes an upper layer 70 of geotextile fabric for filtering coarse materials from storm water that collects within the collection basin. A layer 72 of anti-microbial polymeric material is further provided, which is preferably constructed of a material that is commercially marketed as the AEGIS shield by AEGIS Environments of Midland, Mich. The AEGIS shield is a unique chemical technology that can be applied to a material making it antimicrobially active. The AEGIS Microbe Shield technology permanently bonds (polymerizes) with the substrate and will not leach or diminish overtime. The technology relies on the coating remaining affixed to the substrate —killing microorganisms as they contact the treated surface. The AEGIS Microbe Shield is a reactive silane quaternary ammonium compound. When applied as a liquid to a host filter material the active ingredient in the AEGIS Antimicrobial forms a colorless, odorless, positively charge polymer coating which chemically bonds, virtually irremovable, to the treated surface. When a microorganism comes in contact with the treated surface, the sword punctures the cell membrane and the electrical charge shocks the cell. Since nothing is transferred to the now dead cell, the Antimicrobial doesn't lose strength the sword is ready for the next cell to contact it.

Filtration and treatment unit 24 also further preferably includes at least one layer of geotextile oil absorbent padding 74.

The filtration and treatment unit 24 further preferably includes a layer 76 of treatment material that is specifically designed to remove hydrocarbons ranging from BTEX to crude oil, sheen, chlorinated solvents, PCBs, organic solvents, pesticides & biocides, and organically bound metals from wastewater. Preferably, this type of treatment material 76 is that which is commercially available under the tradename MYCELX from MYCELX Technologies Corporation of Gainesville, Ga. MYCELX chemistry is infused into a filter media that has been optimized for the water stream being treated. The treated MYCELX filter media instantly bonds with the targeted pollutants on contact removing 99+% from the water in a single pass. MYCELX filter media is effective on both semi-soluble or insoluble pollutants preventing the captured contamination from separating, emulsifying, or releasing once contained.

Finally, filtration and treatment unit 24 preferably includes a layer 78 of zeolite that has an ion exchange capacity. Zeolite is a porous crystal material composed mainly an aluminum and silicon with other minerals such as potassium, calcium and sodium, which are used as exchangeable cations. The individual crystals bond together in long chains creating a lattice type network of interconnected cavities, pores and open spaces which provide sites for cation exchange and adsorption. As a filtering media, zeolite will draw liquid runoff into its crystal structure where it is adsorbed onto the large surface areas. Suspended solids are effectively removed, and become physically entrapped or encapsulated within these cavities and pores. The zeolite effectively may function as a filter bed as well as a process material for cation exchange and adsorption. Toxic metal ions in the liquid displace the calcium, sodium or potassium cations in the passageways and become strongly bonded to the numerous exchange sites. The extreme molecular complexity also significantly reduces the external surface area, which further limits the potential mobility of the contaminants to leach back into the environment.

Each zeolite mineral has a distinct ion exchange selectivity and capacity. This process occurs when water molecules can pass through the channels and pores allowing cations present in the solution to be exchanged for cations in the structure. Several factors must be considered in this process. These include solution strength, pH, temperature and the presence of other competing cations in the solution. These factors can affect both the ion exchange selectivity and capacity of the specific zeolite mineral. Chabazite and Clinoptilolite are two of the minerals in the zeolite group that possess superior ion exchange capability. Chabazite is the preferred zeolite material for use in the preferred embodiment of the invention. However, the invention may be practiced using any treatment material, zeolite or otherwise, that is capable of absorbing heavy metals from storm water. This includes zeolites or other materials that have been chemically enhanced to increase their cation exchange capacity.

Figure 8:
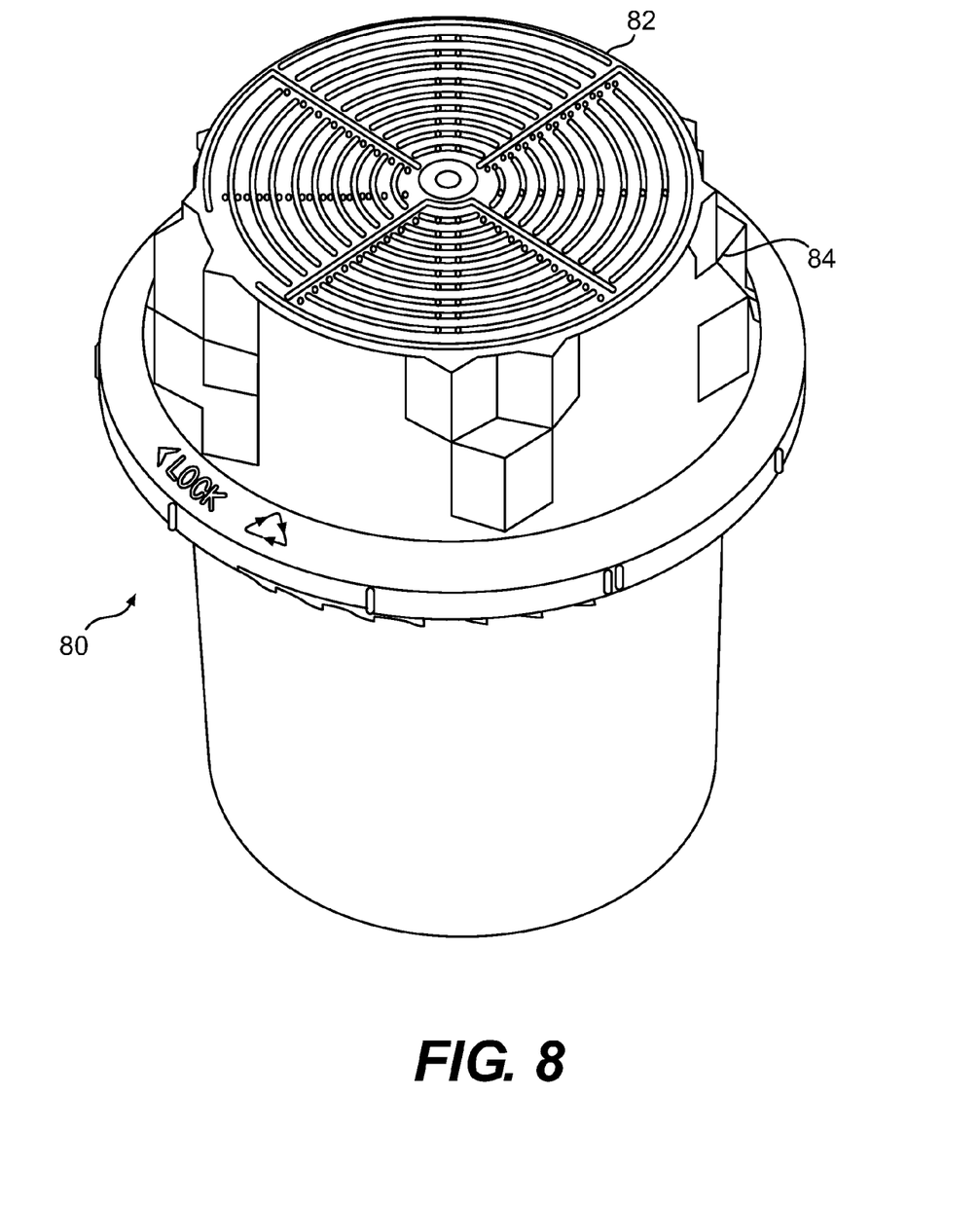
FIG. 8 is a perspective diagrammatical view of a filter cartridge for use with the present invention that is constructed according to an alternative embodiment.

Referring now to FIG. 8, a filtering and treatment cartridge 80 that is constructed according to an alternative embodiment of the invention is identical to the filter cartridge 24 described previously, except that in lieu of the geotextile fabric 70 a coarse strainer plate 82 is provided in addition to one or more layers of open cell foam material 84. In the preferred embodiment, there are four layers of open cell foam material 84, and the open cell foam material is impregnated with an antibacterial agent such as the AEGIS Microbe Shield. The most preferred open cell foam material is a polyether grade 10 ppi PRF reticulated foam. This embodiment of the invention is preferred for storm water that is expected to be especially dirty or muddy, as dirt, mud or sludge may have the effect of clogging the geotextile fabric 70 in a filter cartridge 24 that is constructed according to the first embodiment of the invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. In a storm water drainage system, the improvement comprising, a storm water insert comprising:
    a collection basin, said collection basin having an upper inlet opening and a lower outlet opening;
    a filter positioned in said lower outlet opening of said collection basin for filtering storm water that is held by said collection basin; and
    adjustable mounting structure for mounting said collection basin to an inlet opening of a storm sewer, said adjustable mounting structure comprising at least one mounting flange that has a substantially horizontal upper lip that is constructed and arranged to be supported by a generally horizontal surface of the storm sewer inlet opening; and wherein
    said adjustable mounting structure is configured so that said mounting flange and said upper lip are laterally adjustable between at least two alternative positions with respect to the collection basin, whereby the storm sewer insert may be configured to fit storm sewer inlet openings of different sizes.

2. A storm sewer insert according to claim 1, wherein said collection basin further has at least one bypass opening defined therein for permitting the flow of storm water therethrough when the volume of storm water entering said storm sewer insert exceeds a throughput capacity of said filter.

3. A storm sewer insert according to claim 2, wherein said collection basin comprises at least one upwardly extending sidewall, and wherein said bypass opening is defined in said sidewall.

4. A storm sewer insert according to claim 3, further comprising a deflector member connected to an upper end of said collection basin, said deflector member comprising a downwardly depending apron that is substantially parallel to and spaced a predetermined distance from said bypass opening, whereby oil and debris will be prevented from exiting through said bypass opening during an overflow condition.

5. A storm sewer insert according to claim 2, further comprising an insect barrier for reducing insect passage through said bypass opening.

6. A storm sewer insert according to claim 5, wherein said insect barrier comprises a multiplicity of filaments spanning said bypass opening.

7. A storm sewer insert according to claim 6, wherein at least a plurality of said filaments are oriented substantially vertically.

8. A storm sewer insert according to claim 5, wherein said insect barrier is secured to said collection basin.

9. A storm sewer insert according to claim 1, wherein said filter means comprises a modular filtration cartridge that is removably mounted to said collection basin.

10. A storm sewer insert according to claim 1, wherein said filter comprises a treatment material for treating storm water.

11. A storm sewer insert according to claim 10, wherein said treatment material comprises a zeolite material having an ion exchange capacity.

12. A storm sewer insert according to claim 10, wherein said treatment material comprises an anti-microbial polymer filter.

13. A storm sewer insert according to claim 1, wherein said filter means comprises a woven geotextile fabric.

14. A storm sewer insert according to claim 1, wherein said adjustable mounting structure further comprises a mounting rack that is attached to an upper end of said collection basin, said mounting rack having a contoured upper surface, and wherein said mounting flange has a mounting portion that has a contoured lower surface that is complementary in shape to said contoured upper surface of said mounting rack, said contoured upper surface and said contoured lower surface being configured so that said respective surfaces may be interengaged in at least two alternative positions, whereby the amount of lateral extension of said mounting flange may be discretely adjusted.

15. A storm sewer insert according to claim 14, wherein said contoured upper surface has a plurality of substantially parallel dovetail grooves defined therein, and wherein said contoured lower surface has a plurality of substantially parallel dovetail projections that are sized and spaced to be received in said parallel grooves.

16. A storm sewer insert according to claim 1, wherein said mounting flange comprises an upper lip that extends laterally with respect to the collection basin and that is adapted to rest on a horizontal surface of the storm sewer, a substantially vertical portion and a lower portion that extends laterally inwardly toward a center of the collection basin and that is constructed and arranged to be laterally adjustable between at least two alternative positions with respect to the collection basin.

17. A storm sewer insert according to claim 16, wherein said lower portion has at least one of a dovetail shaped groove and a dovetail shaped projection.

18. A storm sewer insert according to claim 17, wherein said lower portion has at least one dovetail shaped groove and at least one dovetail shaped projection.

19. A storm sewer insert according to claim 1, wherein said filter has a sealed casing.

20. A storm sewer insert according to claim 1, further comprising a plurality of said mounting flanges, each of said mounting flanges being laterally adjustable independently from the other mounting flanges.

* * * * *